May 29, 1962
S. A. MINERA
3,036,613
FRUIT STEMMING MACHINE
Filed March 24, 1960
2 Sheets-Sheet 1
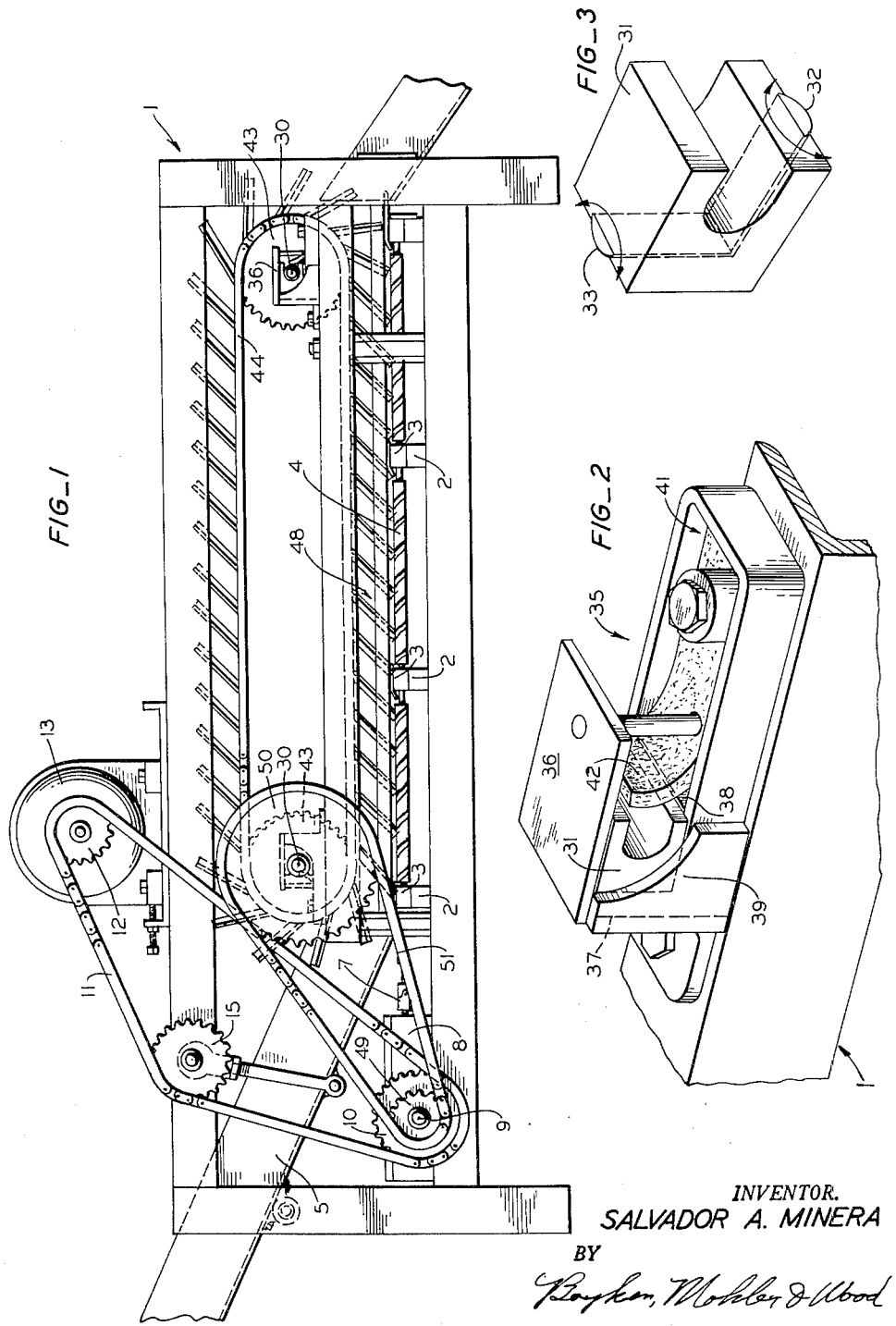
INVENTOR.
SALVADOR A. MINERA
BY
Boyken, Mohler & Wood
ATTORNEYS

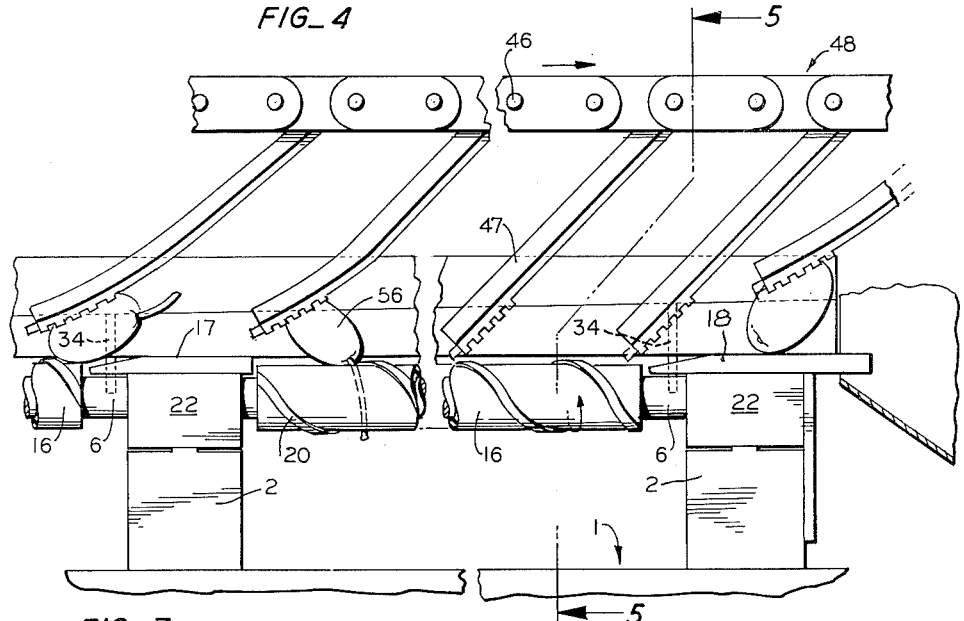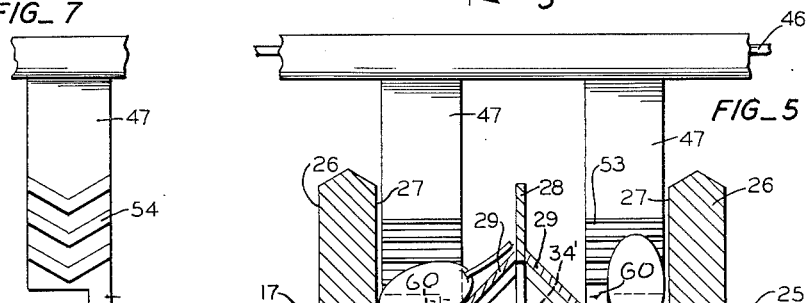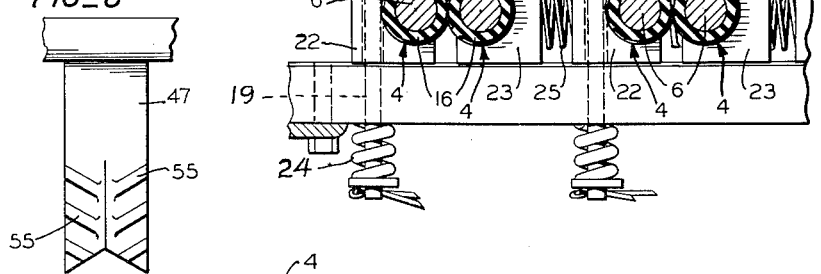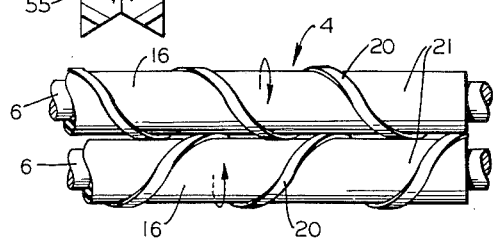

United States Patent Office 3,036,613
Patented May 29, 1962

3,036,613
FRUIT STEMMING MACHINE
Salvador A. Minera, 1500 Judah St. #10,
San Francisco, Calif.
Filed Mar. 24, 1960, Ser. No. 17,280
13 Claims. (Cl. 146—55)

This invention relates to a machine for stemming fruit such as grapes, olives, etc., and is an improvement over the machines disclosed in my United States Letters Patents 2,342,358 and 2,819,745 respectively issued February 22, 1944, and January 14, 1958.

One of the objects of this invention is the provision of a fruit stemmer for fruit that is elongated, such as some varieties of grapes, and olives, and which stemmer is adapted to more efficiently stem the fruit than heretofore.

The principal of stemming elongated grapes or olives by rolling them, in a file, end over end, on a pair of oppositely rotating rollers so that the stems will be caught between the rollers and pulled from the fruit as the latter so rolls along the rollers, is old, as shown in said patents. It has been found, however, that some grapes, or olives, may roll or slide over the rollers with their longitudinal axes crosswise relative to the length of the rollers, in which case the stems will not be caught by the rollers. End over end rolling is essential to the stemming operation.

The above occurrence usually happens where the grapes or olives are retained on the rollers between pairs of guide strips disposed over the rollers parallel therewith but extending divergently upwardly relative to each other. Most of the grapes or olives will be stemmed by this structure where the grapes or olives are physically engaged on their upper sides, as in the aforesaid patents, and positively rolled, but not all.

If the sides of the retaining strips are vertical, in order to constrain the fruit to end over end movement, then the fruit frequently jams between the strips, and fruit is not only injured by attempting to force it past the point or points where the jam occurs, but fruit will ride over other fruit at the jamming point and will not be stemmed.

The present invention completely overcomes the problem of the fruit becoming jammed, and it also insures against the fruit moving over the rollers without being turned so it will roll end over end.

One of the objects of the invention is the provision of structure that prevents jamming of the fruit, and that insures the fruit bodies being rolled end over end so that the stems will be pulled from the fruit during the end over end rolling of the latter.

A still further object of the invention is the provision of a machine that is more compact than heretofore so as to require little space, but which machine is adapted to efficiently stem a larger volume of fruit per hour than heretofore.

The rolling of fruit along rollers, by gravity, or attempts to push fruit downwardly along downwardly inclined rollers has not proven to be satisfactory because the fruit tends to bounce away from the rollers, with the result that many of the fruit bodies remain unstemmed. It has been found that the bodies of fruit may be rolled with great speed, and will be stemmed, if they are held down against the rollers while being rolled and will not slip on the rollers.

One of the objects of the present invention is the provision of structure that prevents the fruit bodies from being slid along the rollers, and which structure insures end over end rolling of the fruit.

Other objects and advantages will appear in the description and drawings.

In the drawings FIG. 1 is a side elevational view of a stemming machine.

FIG. 2 is an enlarged isometric view of one of the several bearings used, and which are indicated in dotted lines in FIG. 1;

FIG. 3 is an isometric view of the bearing of FIG. 2 separate from its mounting;

FIG. 4 is an enlarged fragmentary side elevational view showing the grape or olive moving means and one of the pair of rollers on which the fruit is to be rolled;

FIG. 5 is an enlarged sectional view taken along line 5—5 of FIG. 4;

FIG. 6 is a fragmentary top plan view of a pair of rollers;

FIG. 7 is a fruit engaging strip of slightly different design than that shown in FIG. 5;

FIG. 8 is a fruit engaging strip that is of slightly different design than that shown in FIGS. 5 and 7.

In the following description the use of the word "grape" or "grapes" is not intended to be a restriction on the adaptability of the stemmer, since it is adapted to stem olives and any fruit that have a similar physical shape.

Also in the drawings only several sets or pairs of rollers are shown, as in FIG. 5. It is to be understood that one machine may have any desired number of sets. Commercially, a machine having six sets, or pairs, of rollers is adapted to stem over a ton of grapes or olives per hour, which is a practical capacity for each machine for efficient feeding thereto but more or less pairs of rollers may be used, if desired.

In detail the machine that is illustrated comprises a frame, generally designated 1, having cross frame members 2 that support bearings 3 that, in turn, support the rollers 4 on which the grapes are supported during their end over end rolling from one end of the machine to the other.

A feed chute 5 at the head of the machine is adapted to feed the fruit onto the pairs of rollers that are adapted to perform the stemming operation.

These rollers, as seen in FIG. 1 are horizontal and FIG. 5 shows that they are disposed in a horizontal plane in parallel, side by side engaging relation, with the pairs spaced apart.

The rollers themselves preferably comprise steel bars 6 (FIG. 5) that are connected at one of their corresponding ends by universal couplings 7 (FIG. 1) with gears in a gear box 8. A shaft 9 mounted on one end of frame 1 adjacent to the chute 5 connects with gears (not shown) in gear box for driving the rollers of each pair oppositely, and in directions for downward movement of their adjacent sides, as shown and explained in said U.S. Patent 2,819,745.

Shaft 9 has a sprocket wheel 10 on one end thereof, which sprocket wheel is connected by a sprocket chain 11, with a sprocket wheel 12 driven by motor 13. A chain tightener 15 may be mounted on frame 1 for tightening the chain.

The steel bars of the rollers 4 are covered with relatively soft rubber tubing 16 to provide a rubber outer layer on the rollers. The bars are left bare where they are supported by bearings 3, and bridge strips or pieces 17 extend over the bearings for carrying the grapes across the gaps in the resilient outer layers on the rollers.

The outer surfaces of the rollers (which are the outer surfaces of the rubber covering) are each formed with a relatively narrow spiral ridge 20. The ridge 20 on one roller of each pair twists oppositely to the ridge on the other roller, and they are arranged so that they are not in registration with each other, but the ridge on each roller engages the other roller at points on the cylindrical surfaces 21 that are between the ridges, as seen in FIG. 6. The ridges are shallow and the stems on the fruit will be tightly gripped between the rollers of each pair thereof at any point along the lengths of the rubber outer layers. The rollers and the pitch of the ridges and their widths and thicknesses are illustrated in substantially actual size in FIG. 6 in which the ridges are approximately one sixty-fourth of an inch in depth, and when compressed, the rollers will be substantially in engagement from end to end.

The direction of the ridges relative to the direction of rotation of the rollers of each pair is such that the movement of the grapes from the feed end of the rollers to the discharge end is retarded. In the absence of any other force tending to move the grapes to the discharge end, they would tend to be moved by the ridges toward the feed ends. The rotation of the rollers alone, as described, will tend to cause the grapes to position themselves on the rollers with their major axes in a vertical plane that is parallel with the longitudinal axes of the rollers.

The rollers of each pair are mounted at each of their corresponding ends in bearings 22, 23 (FIG. 5).

These bearings are open at their opposed sides so that the rods 6 may be inserted and removed therefrom in a lateral direction. Also, since the opposed sides of the ends of each pair of rods 6 are exposed, lubrication thereof is simple. The blocks being preferably of lignum vitae, lubrication is preferably by water, which is available and is used on the fruit and for cleaning the machine. Hence there is no contamination of the fruit nor any injury to the rollers by oil.

Bearings 22 that are at the ends of one of the rollers of each pair are stationary on one of the pairs of cross frame members, while the bearings 23 mounting the other roller are spring urged by spring 25 toward the stationary bearing. By placing the bearings 23 of each adjacent pair next to each other, a single spring performs the same function for a pair of the bearings 23.

Extending over the row of bearings at each of the ends of the rollers, is a strip 18 that is yieldably held downwardly against the bearings by bolts 19 that extend through the bearings 22 and rather loosely through the end frame members 2. A spring 24 reacts between a washer on the lower end of each bolt and frame member 2 to yieldably hold the bearings 22, 23 down. Thus the bearings 22, 23 are able to move, but are yieldably held down, and by merely slipping out the bolts 19, any bearing 22 can be quickly changed. Bearings 23 can be changed without removing the bolts, and none of the shafts 6 need to be removed to change bearings, and conversely, the shafts can be changed without removing the bearings.

By the above structure, the rollers carried by the movable bearings 23 are yieldably held against the rollers that are carried by the bearings 22, thereby providing an automatic take-up for wear, and also permitting the rollers to yieldably move apart under the influence of stems or foreign material that may be carried between the rollers of each pair.

Supported over bearing 22 that supports one roller of one pair thereof and over bearing 23 that supports one roller of the pair of rollers adjacent to said one pair, are guide strips 26 having flat opposed, parallel vertical sides 27, each of which side is disposed in a vertical plane that extends through the rollers respectively carried by said bearings 22, 23. These strips 26 are supported at their ends on cross frame members of the frame and they extend substantially the full length of the rollers. The upper sides of each of the strips 26 extend convergently upwardly to meeting relation so that no fruit will lodge on said upper sides, but will be diverted to one side or the other of each strip.

As seen in FIG. 5 a vertical guide strip 28 may be positioned midway between the adjacent rollers 4 of each adjacent pair thereof that are carried by bearings 23.

Spaced midway between each pair of adjacent strips 26 is an inverted V-shaped guide strip 29 having a vertically disposed portion 28 extending upwardly from the apex of the V. These strips 29 extend the length of the rollers between their feed and discharge ends, and preferably are slightly slanted upwardly in a direction from their feed to their discharge ends, although they may be straight. In cases of overloading the machine at the feed ends of the rollers, the fruit more readily distributes itself where the strips are slanted.

The space between each surface 27 and the strip 28 opposed thereto is preferably substantially greater than the maximum length of any fruit that is to be stemmed.

Shafts 30 spaced above the level of rollers 4 and adjacent to the opposite ends of the latter are rotatably supplied in oppositely outwardly opening bearings 31 (FIGS. 1, 2, 3).

Each of the bearings 31 is preferably of lignum vitae, and rectangular, with the laterally opening generally semi-cylindrical recess in one side for receiving the ends of shafts 30.

The lower side of each bearing has projecting ridge 32 thereon extending perpendicular to the shaft 30 that is adapted to be supplied by the bearing, and a corresponding ridge 33 is on the side of the bearing opposite to the shaft receiving side thereof.

These ridges may be metal strips having transversely rounded outer surfaces, and which strips may be tightly seated and held in grooves formed in the bearings.

Ridge 33 is in the same vertical plane as ridge 32 and both ridges are centrally positioned between the ends of each bearing, and their function is to rockably support the bearings so they will be self aligning with respect to the shafts 30. The ridges 33 when against a flat vertical support, will permit the bearings to rock in a horizontal plane, while the ridges 32 on the undersides of the bearings will permit the latter to rock in a vertical plane.

Referring specifically to FIGS. 4, 5, it will be seen that vertical pins 34 (FIGS. 4, 5) are rigidly secured at their upper ends to each V-shaped guide strip 29, between the sides of the V. The cross strips 17, 18, that extend across bearings 22, 23 each have an opening therein through which each of the pins 34' is adapted to pass. This is sufficient structure to hold the guide strips in position, and they can be freely lifted off the strips 18, 19 if and when desired.

Mounting each bearing is a casting generally designated 35 (FIG. 2) having a horizontal upper wall 36 spaced above the bearing 31; a rear vertical wall 37 against which the ridge 33 is supported; a horizontal bottom wall 38 on which the ridge 32 is supported. One lateral wall 39 is positioned at one side of each bearing 31 to prevent the bearing from being moved out of said side, while a conventional collar on each of the shafts 30 at each end thereof will prevent the bearing at each such end from moving out of the opposite sides of the castings.

A well 41 at the open side of each bearing and below the latter is adapted to hold the lubricant. In this instance water is used, and a wick 42 extending into said well and across and in engagement with the exposed side of the shaft is adapted to carry the lubricant to the shaft and to apply it to the latter.

The shafts 30 have a sprocket wheel 43 secured to each end thereof and a pair of endless chains 44 connect the wheels at each of the corresponding ends of the shafts. Chains 44 carry spaced crossbars 46 (FIGS. 4, 5) that are link connections at their opposite ends connecting certain of the links of the sprocket chains and rigid with one of the links.

The crossbars 46 extend at right angles to the rollers 4 and each has a yieldable rubber strip 47 secured thereto. As a practical matter each crossbar 46 may be covered with rubber vulcanized thereon with one end of each strip 47 integral with the rubber that covers the bar.

Where there are a plurality of pairs of rollers 4, there is one strip 47 for each pair of rollers, hence each crossbar 46 will have six strips thereon if there are six pairs of rollers.

The foregoing structure provides an endless row of strips 47 above the rollers 4, and the lower horizontally extending flight 48 (FIGS. 1, 4) is adjacent to and parallel with the pairs of rollers 4.

The shaft 9 which is driven by its connection with motor 13, carries a sprocket wheel 49 that, in turn, is connected with a sprocket wheel 50 on shaft 30 that is adjacent thereto, by means of a chain 51, for driving the endless row of strips 47. Thus driving connection between motor 13 and the strips 47 is such that the lower flight 48 moves longitudinally of the rollers in a direction from the feed end to the discharge end of the latter.

The strips 47 are positioned relative to the crossbars 46 so that they will extend downwardly and incline rearwardly relative to their direction of movement.

The words "rearwardly," "forwardly," and other words of similar import relate to the direction of travel of the flight 48. The "forward" end of the machine is the discharge end and the "rear" end is the feed end.

The strips 47 are preferably substantially rectangular having square lower ends, and the forward surfaces of the strips at their lower ends are preferably formed with horizontally extending ridges 53 although they may be roughened in any other manner. For example, in FIG. 7 V-shaped ridges 54 in herringbone arrangement are shown, and in FIG. 8, the lower end of each strip may be of V-shaped outline instead of straight across, horizontally, and the projections 55 may be only the upper ends of the V-shaped ridges of FIG. 7, with the thickness of the ridges along the side edges of the strips being the thickest portions thereof, said projections becoming progressively thinner as they extend downwardly.

In any event, the strips will ride over the grapes 56 (FIGS. 4, 5) causing the grapes to roll on the rollers 4 from the feed to the discharge end of the machine.

In FIG. 5, it will be seen that the lower edge of each strip 47 is formed with a downward projector 60 at the end of the lower edge nearest to the inclined guide strip 29. This downward projector may be used on any of the strips, whether it has horizontal or inclined ridges on the face that engages the grapes.

As was pointed out in the objects of the invention, this invention is principally directed to providing means for compelling the grapes 56 to roll end over end at the earliest possible moment after they are fed onto the rollers, since only such grapes are roll end over end will be efficiently stemmed. Inseparable from the above object is that of insuring against jamming of the fruit on the rollers and between the strips that cooperate with each pair of rollers for forming the sides of an upwardly opening channel.

The strips 47 of flight 48 have one of their side edges close to the vertical surface 27 and the other edge is over strip 29 but fairly close to the lower edge of the latter.

In operation upon the grapes being fed onto the pairs of rollers at the feed ends of the latter, some may be in correct position for being rolled end over end on the rollers. Others will lie crosswise of the rollers with one of their ends against the vertical surface 27 of guide strip 26 in which case the other end will lie on the inclined guide strip 29.

As soon as the rubber strips 47 of the lower flight 48 engage the grapes that lie crosswise, the said rubber strips 47 will cause the grapes to roll on the rollers toward the discharge ends of the rollers, but the rubbing of the one end of each crosswise grape against surface 27 of guide strip 26 will cause such end to be retarded in its movement, thereby swinging the grape so it will roll end over end.

No jamming can possibly occur between the guide strips 26 and 29 because the latter are inclined and any grapes that might otherwise tend to jam, will be merely forced upwardly on the inclined strips 29. The surface 27 being vertical and substantially coplanar with a vertical plane between rollers 4 of each pair, the grapes cannot fall over at that side of the rollers, once the grapes are rolled end over end, hence only one straightening action on the grapes is required. After that they will be rotated end over end.

Any tending of the grapes to slide on the rollers 4 instead of rolling thereon is stopped by the ridges 20 on the rollers, and also said ridges cooperate with the rubber grape engaging strips to turn the grapes for rolling end over end upon any of the grapes starting to slide on the rollers and then engaging one of the ridges 20.

In actual practice, rollers 4 may be made even shorter than heretofore since any grapes that may be crosswise of the rollers at the feed ends of the latter will be turned to roll end over end much sooner than heretofore, and upon each grape making an end over end revolution on the rollers, the stem thereon will be plucked therefrom.

It is to be understood that certain modifications may be made in the structure that has been specifically described, and still come within the spirit of the invention and the scope of the claims.

I claim:

1. In a stemmer for fruit such as elongated grapes, olives and the like, the combination of; a pair of parallel, elongated, horizontally extending rollers in side by side relation adapted to support such fruit for rolling thereon from one of their ends to the other, a pair of guide strips over said rollers extending longitudinally thereof; one of said guide strips having a vertically positioned surface disposed in a vertical plane parallel with and extending substantially through the axis of one roller of said pair and generally facing the other strip of said pair; said other strip being inclined transversely thereof in an upward direction away from said one strip, the lower edges of said strips being relatively close to the upper surfaces of said rollers; and grape engaging means over said rollers movable longitudinally thereof from said one of the ends of said rollers to the other, and means supporting said grape engaging means sufficiently close to said rollers to engage grapes on the latter for rolling them along said rollers.

2. In a stemmer for fruit such as elongated grapes, olives and the like, the combination of; a pair of parallel, elongated, horizontally extending rollers in side by side relation adapted to support such fruit for rolling thereon from one of their ends to the other, a pair of guide strips over said rollers extending longitudinally thereof; one of said guide strips having a vertically positioned surface disposed in a vertical plane parallel with and extending substantially through the axis of one roller of said pair and generally facing the other strip of said pair; said other strip being inclined transversely thereof in an upward direction away from said one strip, the lower edges of said strips being relatively close to the upper surfaces of said rollers; and grape engaging means over said rollers movable longitudinally thereof from said one of the ends of said rollers to the other, and means supporting said grape engaging means sufficiently close to said rollers to engage grapes on the latter for rolling them along said rollers, said grape engaging means comprising a row of strips projecting downwardly between said guide strips, the lower end portions of said strips being relatively flexible and resilient for yieldably riding over the grapes adapted to be positioned on said rollers, each of said strips having vertical side edges one of which is closely adjacent to said vertically positioned surface to preclude passage of grapes between said strips and said surface during movement of said strips longitudinally of said rollers.

3. A stemmer for elongated fruit such as grapes, olives and the like, comprising: a pair of horizontally extending, elongated, parallel rollers in side by side engaging relation adapted to support grapes for movement thereon from one of the ends of said rollers to the other; a pair of guide means over and closely adjacent to said rollers, respectively, extending longitudinally thereof for retaining said grapes on said rollers; said guide means respectively having generally opposedly facing surfaces extending upwardly from the upper sides of said rollers, one of which surfaces extends substantially vertical and the other of which extends slantingly upwardly away from said one of said surfaces providing an upwardly opening channel for said fruit having vertical and inclined opposite sides with said rollers forming the bottom thereof whereby the elongated fruit in said channel moving longitudinally thereof will not become jammed, yieldably grape engaging means over said rollers movable longitudinally of said rollers from one end thereof to the other, supporting means supporting said grape engaging means in a position for engagement between the latter and the upper surfaces of grapes on said rollers, and means on said rollers projecting radially therefrom for frictional engagement with such grapes to prevent sliding of said grapes longitudinally of said rollers under the influence of said grape engaging means.

4. A stemmer for grapes and the like comprising: a pair of parallel, horizontally extending, elongated rollers in side by side engaging relation adapted to support individual grapes thereon for rolling from one of the ends of said rollers each having an outer layer of relatively soft resilient material formed with a helical ridge, the ridge on one roller of said pair having a twist the reverse of the other, means for feeding grapes onto said rollers at one of their ends, grape moving means above said rollers movable longitudinally of said rollers from one of their ends to the other positioned to engage grapes on said rollers for rolling said grapes from said one of their ends to the other, means connected with said rollers for rotating them oppositely and in directions for downward movement of their adjacent sides whereby stems on said grapes will be engaged between said pair of rollers for pulling from said grapes, the direction of the twist of the ridges on said rollers relative to the direction of rotation of said rollers and the direction of movement of said grape moving means being such that the ridges on said rollers will tend to move said grapes on the rollers in a direction opposite to the direction of movement of said grape moving means to thereby resist slippage of grapes on said rollers in the direction of movement of said grape moving means.

5. In a grape stemmer that includes a horizontal row of elongated stemming rollers in parallel, side by side engaging relation for supporting grapes on separate pairs of said rollers for rolling of said grapes on said pairs longitudinally thereof, means connected with said rollers for rotating the rollers of each of said pairs oppositely in directions for movement of their adjacent sides downwardly whereby the stems on said grapes will be drawn downwardly therefrom upon said stems being caught between the rollers of each pair, a pair of rotatable shafts respectively positioned adjacent each of the ends of the rollers of said row extending substantially at right angles to the latter, an endless, horizontally extending row of grape engaging means comprising upper and lower flights extending at their ends around said shaft and mounted on the latter with the lower flight spaced above said rollers for longitudinal movement of the latter in engagement with grapes adapted to be positioned on said rollers upon rotation of one of said shafts, means connected with one of said shafts for rotating it to effect said movement of said lower flight, oppositely laterally outwardly opening bearings supporting said shafts for rotation and for holding said flights relatively taut, means mounting said bearings for rocking vertically and horizontally whereby said bearings will automatically align themselves with said shafts, said shafts being exposed along the open sides of said bearings, and means for applying a lubricant to said exposed sides of said shafts.

6. In a grape stemmer that includes a horizontal row of elongated stemming rollers in parallel, side by side engaging relation for supporting grapes on separate pairs of said rollers for rolling of said grapes on said pairs longitudinally thereof, means connected with said rollers for rotating the rollers of each of said pairs oppositely in directions for movement of their adjacent sides downwardly whereby the stems on said grapes will be drawn downwardly therefrom upon said stems being caught between the rollers of each pair, a pair of rotatable shafts respectively positioned adjacent each of the ends of the rollers of said row extending substantially at right angles to the latter, an endless, horizontally extending row of grape engaging means comprising upper and lower flights extending at their ends around said shaft and mounted on the latter with the lower flight spaced above said rollers for longitudinal movement of the latter in engagement with grapes adapted to be positioned on said rollers upon rotation of one of said shafts, means connected with one of said shafts for rotating it to effect said movement of said lower flight, oppositely laterally outwardly opening bearings supporting said shafts for rotation and for holding said flights relatively taut, means mounting said bearings for rocking vertically and horizontally whereby said bearings will automatically align themselves with said shafts, said shafts being exposed along the open sides of said bearings, and means for applying a lubricant to said exposed sides of said shafts, said last mentioned means including a well containing such lubricant adjacent to each shaft, and a wick extending into said well and against said one side of each shaft.

7. A stemmer for elongated grapes, olives and the like, comprising; a pair of horizontally extending, elongated, parallel rollers in side by side engaging relation adapted to support grapes for movement thereon from one of the ends of said rollers to the other, a pair of guide means over said rollers extending longitudinally thereof for retaining said grapes on said rollers, one of said guide means including a strip having one of its longitudinally extending edges spaced over and parallel with one roller of said pair and inclined upwardly from said one of its edges in direction away from said pair of rollers and the other guide means of said pair thereof being an elongated member over and parallel with the other roller of said pair and having a substantially vertical lateral surface facing toward said inclined strip thereby precluding jamming of grapes on said rollers and between said guide means during rolling of such grapes on said rollers and between said guide means in direction longitudinally of said rollers, and means over said rollers engageable with grapes on said rollers and movable longitudinally of said rollers for so rolling said grapes.

8. In a stemmer for elongated fruit bodies having stems projecting from one of their ends, and which stemmer includes; a pair of horizontally extending rollers in side by side substantially engaging relation adapted to support such fruit bodies thereon for rolling from one of the ends of said rollers to the other, a frame having bearings supporting said rollers for rotation and means connected with said rollers for rotating them in directions for downward movement of their adjacent sides, strip-supporting means spaced above said rollers, a flexible strip directly over said pair of rollers secured at one end to said strip supporting means and depending therefrom, said strip terminating at its lower end in a free edge extending transversely of the lengths of said rollers and adjacent to the latter for engaging fruit bodies on said rollers and means mounting said strip supporting means on said frame for movement longitudinally of said rollers from said one of their ends to the other; a downwardly extending projection on said strip at one end of said free edge and over one roller of said pair for engaging one of the ends of any of transversely disposed fruit bodies that may be on said rollers positioned with their major axes extending transversely of said rollers for turning such bodies about vertical axes upon said movement of said strip so that the major axes of said bodies will be disposed in a vertical plane between and parallel with said rollers to enable their stems to be gripped between said pair of rollers upon end over end rolling of said bodies under the influence of said movement of said strip.

9. In a stemmer for elongated fruit bodies having stems projecting from one of their ends, and which stemmer includes; a pair of horizontally extending rollers in side by side substantially engaging relation adapted to support such fruit bodies thereon for rolling from one of the ends of said rollers to the other, a frame having bearings supporting said rollers for rotation and means connected with said rollers for rotating them in directions for downward movement of their adjacent sides, strip-supporting means spaced above said rollers, a flexible strip directly over said pair of rollers secured at one end to said strip supporting means and depending therefrom, said strip terminating at its lower end in a free edge extending transversely of the lengths of said rollers and adjacent to the latter for engaging fruit bodies on said rollers and means mounting said strip supporting means on said frame for movement longitudinally of said rollers from said one of their ends to the other; a downwardly extending projection on said strip at one end of said free edge and over one roller of said pair for engaging one of the ends of any of transversely disposed fruit bodies that may be on said rollers positioned with their major axes extending transversely of said rollers for turning such bodies about vertical axes upon said movement of said strip so that the major axes of said bodies will be disposed in a vertical plane between and parallel with said rollers to enable their stems to be gripped between said pair of rollers upon end over end rolling of said bodies under the influence of said movement of said strip, stationary means on said frame extending from end to end of said rollers and disposed over the other roller of said pair opposite to the one below said projection providing a substantially vertical surface extending upwardly from the upper side of said other roller in a position substantially midway between the lateral sides of said other roller for frictional engagement with an end of such transversely disposed bodies.

10. In a stemmer for elongated fruit bodies having stems projecting from one of their ends, and which stemmer includes; a pair of horizontally extending rollers in side by side substantially engaging relation adapted to support such fruit bodies thereon for rolling from one of the ends of said rollers to the other, a frame having bearings supporting said rollers for rotation and means connected with said rollers for rotating them in directions for downward movement of their adjacent sides, strip-supporting means spaced above said rollers, a flexible strip directly over said pair of rollers secured at one end to said strip supporting means and depending therefrom, said strip terminating at its lower end in a free edge extending transversely of the lengths of said rollers and adjacent to the latter for engaging fruit bodies on said rollers and means mounting said strip supporting means on said frame for movement longitudinally of said rollers from said one of their ends to the other; a downwardly extending projection on said strip at one end of said free edge and over one roller of said pair for engaging one of the ends of any of transversely disposed fruit bodies that may be on said rollers positioned with their major axes extending transversely of said rollers for turning such bodies about vertical axes upon said movement of said strip so that the major axes of said bodies will be disposed in a vertical plane between and parallel with said rollers to enable their stems to be gripped between said pair of rollers upon end over end rolling of said bodies under the influence of said movement of said strip, stationary means on said frame extending from end to end of said rollers and disposed over the other roller of said pair opposite to the one below said projection providing a substantially vertical surface extending upwardly from the upper side of said other roller in a position substantially midway between the lateral sides of said other roller for frictional engagement with an end of such transversely disposed bodies, the space between said vertical surface and said projection being approximately the length of the minor axes of such bodies.

11. In a stemmer for elongated fruit bodies having stems projecting from one of their ends, and which stemmer includes; a pair of horizontally extending rollers in side by side substantially engaging relation adapted to support such fruit bodies thereon for rolling from one of the ends of said rollers to the other, a frame having bearings supporting said rollers for rotation and means connected with said rollers for rotating them in directions for downward movement of their adjacent sides, strip-supporting means spaced above said rollers, a flexible strip directly over said pair of rollers secured at one end to said strip supporting means and depending therefrom, said strip terminating at its lower end in a free edge extending transversely of the lengths of said rollers and adjacent to the latter for engaging fruit bodies on said rollers and means mounting said strip supporting means on said frame for movement longitudinally of said rollers from said one of their ends to the other; a downwardly extending projection on said strip at one end of said free edge and over one roller of said pair for engaging one of the ends of any of transversely disposed fruit bodies that may be on said rollers positioned with their major axes extending transversely of said rollers for turning such bodies about vertical axes upon said movement of said strip so that the major axes of said bodies will be disposed in a vertical plane between and parallel with said rollers to enable their stems to be gripped between said pair of rollers upon end over end rolling of said bodies under the influence of said movement of said strip, stationary means on said frame extending from end to end of said rollers and disposed over the other roller of said pair opposite to the one below said projection providing a substantially vertical surface extending upwardly from the upper side of said other roller in a position substantially midway between the lateral sides of said other roller for frictional engagement with an end of such transversely disposed bodies, a guide strip extending longitudinally of said pair of rollers extending along and over the roller that is below said projection and upwardly and in a direction slantingly away from said pair of rollers.

12. In a stemmer for elongated fruit bodies having stems projecting from one of their ends and which stemmer includes; two spaced pairs of horizontally extending rollers disposed in a horizontal plane and in parallel, side by side engaging relation adapted to support such fruit bodies thereon for rolling from one of the ends of each pair of rollers to the other ends thereof; a frame having bearings supporting said rollers for rotation and means connected with said rollers for rotating the rollers of each pair in directions for downward movement of their adjacent sides; a pair of elongated guide strips extending longitudinally of said rollers from end to end thereof over the space between said two pairs and convergently upwardly transversely of said strip from the upper surfaces of the adjacent rollers of said two pairs thereof, feed means for feeding fruit bodies onto one of the correspondingly positioned ends of said pairs of rollers, and the upper edges of said guide strips extending slantingly upwardly from the ends thereof adjacent to said feed means toward their opposite ends and the lower edges of said guide strips being parallel with the upper surfaces of said adjacent rollers.

13. In a stemmer for fruit such as elongated grapes, olives and the like, the combination of; a pair of parallel, elongated, horizontally extending rollers in side by side relation adapted to support such fruit for rolling thereon from one end of said rollers to the other end thereof; means supporting said rollers for rotation about their axes; means connected with said rollers for rotating them for downward movement of their adjacent sides; a pair of guide strips; means supporting the guide strips of said pair over said rollers respectively in positions extending longitudinally of said rollers; and relatively close to the upper surfaces of the latter; one guide strip of said pair having a laterally facing surface extending substantially vertically upwardly from one roller of said pair and the other strip of said pair having a generally upwardly and laterally facing surface inclined transversely of said other strip from the other roller of said pair away from said one strip in an upward direction whereby a horizontally disposed elongated fruit over said pair of rollers disposed with its major axis extending transversely of the axis of said rollers with its ends in engagement with said laterally facing surface on said on strip and with the inclined surface on the other strip will move to a position with its major axis substantially in a vertical plane between said rollers upon rolling such fruit toward one of the ends of said rollers; grape engaging means between said strips movable longitudinally thereof engageable with fruit disposed between said strips for rolling such fruit from toward said one of the ends of said rollers.

References Cited in the file of this patent

UNITED STATES PATENTS

| | | |
|---|---|---|
| 603,029 | Pettit | Apr. 26, 1898 |
| 1,703,123 | Triplett | Feb. 26, 1929 |
| 1,835,190 | Stansbury | Dec. 8, 1931 |
| 1,924,111 | Erickson | Aug. 29, 1933 |
| 2,819,745 | Minera | Jan. 14, 1958 |